United States Patent
Kobayashi et al.

(10) Patent No.: US 11,368,655 B2
(45) Date of Patent: Jun. 21, 2022

(54) COLOR CORRECTION DEVICE

(71) Applicant: JVCKENWOOD CORPORATION, Yokohama (JP)

(72) Inventors: Toshihide Kobayashi, Yokohama (JP); Etsuro Imade, Yokohama (JP); Masakazu Tateishi, Yokohama (JP)

(73) Assignee: JVCKENWOOD CORPORATION, Yokohama (JP)

( * ) Notice: Subject to any disclaimer, the term of this patent is extended or adjusted under 35 U.S.C. 154(b) by 57 days.

(21) Appl. No.: 17/081,398

(22) Filed: Oct. 27, 2020

(65) Prior Publication Data

US 2021/0044784 A1 Feb. 11, 2021

Related U.S. Application Data

(63) Continuation of application No. PCT/JP2019/022907, filed on Jun. 10, 2019.

(30) Foreign Application Priority Data

Jun. 18, 2018 (JP) .............................. JP2018-115318

(51) Int. Cl.
*H04N 9/097* (2006.01)
*H04N 5/374* (2011.01)
(Continued)

(52) U.S. Cl.
CPC ............. *H04N 9/097* (2013.01); *H04N 5/374* (2013.01); *H04N 9/0455* (2018.08); *H04N 2209/049* (2013.01)

(58) Field of Classification Search
CPC ...... H04N 9/097; H04N 5/374; H04N 9/0455; H04N 2209/049; H04N 1/6008;
(Continued)

(56) References Cited

U.S. PATENT DOCUMENTS 7,742,081 B2 * 6/2010 Chiba .................. H04N 1/6027
348/280
2006/0072172 A1 4/2006 Loew
(Continued)

FOREIGN PATENT DOCUMENTS

JP 2001-359114 A 12/2001
JP 2010-171844 A 8/2010

OTHER PUBLICATIONS

Extended Search Report dated May 11, 2021 issued in corresponding European Application No. 19823217.5.

*Primary Examiner* — Albert H Cutler (74) *Attorney, Agent, or Firm* — Nath, Goldberg & Meyer; Jerald L. Meyer (57) ABSTRACT

A linear matrix circuit generates a second R signal, a second G signal, and a second B signal by performing a matrix operation of a correction coefficient of 3 rows×3 columns including first to third correction coefficients, fourth to sixth correction coefficients, and seventh to ninth correction coefficients on a first R signal, a first G signal, and a first B signal. An R coefficient corrector performs correction so that the first correction coefficient to be multiplied by the first R signal is caused to be close to 1 and the second and third correction coefficients to be respectively multiplied by the first G signal and the first B signal are caused to be close to 0, as a first difference value obtained by subtracting the first G signal from the first B signal increases when the first difference value exceeds a first threshold.

8 Claims, 4 Drawing Sheets (51) Int. Cl.
    *H04N 9/04*           (2006.01)
    *H04N 1/60*           (2006.01)
    *H04N 9/07*           (2006.01)
    *H04N 9/09*           (2006.01)
    *G06T 1/00*           (2006.01)
    *H04N 9/67*           (2006.01)

(58) Field of Classification Search
    CPC .... H04N 1/6086; H04N 9/04557; H04N 9/07; H04N 9/09; H04N 9/04; H04N 9/67; H04N 1/6077; H04N 1/608; H04N 1/60; H04N 9/73; H04N 9/735; H04N 13/133; G06T 1/00; G06T 5/00; G06T 5/001; G06T 5/009; G06T 2207/00; G06T 2207/10004; G06T 2207/10024; G06T 2207/20172; G09G 2320/0666
    USPC ............................................ 348/223.1, 224.1
    See application file for complete search history.

(56) References Cited

U.S. PATENT DOCUMENTS

| | | | |
|---|---|---|---|
| 2007/0070216 A1* | 3/2007 | Yabe | H04N 5/235 348/229.1 |
| 2008/0225135 A1* | 9/2008 | Mizukura | H04N 9/04515 348/E9.051 |
| 2010/0020242 A1* | 1/2010 | Lammers | H04N 9/67 348/642 |
| 2015/0296193 A1* | 10/2015 | Cote | H04N 9/04557 382/167 |

* cited by examiner

COLOR CORRECTION DEVICE

CROSS REFERENCE TO RELATED APPLICATION

This application is a Continuation of PCT Application No. PCT/JP2019/022907, filed on Jun. 10, 2019, and claims the priority of Japanese Patent Application No. 2018-115318, filed on Jun. 18, 2018, the entire contents of both of which are incorporated herein by reference.

BACKGROUND

The present disclosure relates to a color correction device used for an image capturing device.

Typically, a color correction device used for an image capturing device corrects a color of an image capturing signal so that the color becomes a natural color when the image capturing device captures an image of a subject under a light source having a wide-band wavelength such as the sun or a halogen lamp.

In recent years, an LED light source becomes widely used as a light source having a narrow-band wavelength. For example, light emitted from a blue LED light source does not include a green component. When the image capturing device captures the image of the subject under the blue LED light source, and the color correction device is set to correct the color of the image capturing signal so that the color becomes the natural color under the light source having the wide-band wavelength, the image capturing device cannot capture an image of the natural color of the subject.

Therefore, a conventional color correction device includes a color correction mode used when an image is captured under the light source having the wide-band wavelength and a color correction mode used when an image is captured under the LED light source having the narrow-band wavelength. A user selects an appropriate mode in accordance with the light source at the time of capturing the image. Accordingly, it is possible to capture the image of the natural color of the subject regardless of a type of a light source.

SUMMARY

However, when an appropriate color correction mode is forgotten to be selected, or is selected by mistake, it is not possible to capture an image of a natural color of a subject. It is complicated to select the color correction mode in accordance with a type of a light source. Therefore, the appearance of a color correction device is desired that can automatically correct a color of an image capturing signal so that the color becomes the natural color in response to the type of light source.

An aspect of one or more embodiments provides a color correction device used for an image capturing device, the color correction device including: a linear matrix circuit configured to generate a second R signal, a second G signal, and a second B signal by performing a matrix operation of a correction coefficient of 3 rows×3 columns including first to third correction coefficients, fourth to sixth correction coefficients, and seventh to ninth correction coefficients on a first R signal, a first G signal, and a first B signal that are generated by the image capturing device capturing an image of a subject; and an R coefficient corrector configured to perform correction so that the first correction coefficient to be multiplied by the first R signal is caused to be close to 1, and the second and third correction coefficients to be respectively multiplied by the first G signal and the first B signal are caused to be close to 0, as a first difference value obtained by subtracting the first G signal from the first B signal increases, when the first difference value exceeds a first threshold.

DETAILED DESCRIPTION

Hereinafter, a color correction device according to one or more embodiments will be described with reference to the accompanying drawings. Before describing a configuration and an operation of the color correction device according to one or more embodiments illustrated in FIG. 1, a configuration and an operation of an image capturing device including a color correction device having a basic configuration will be described with reference to FIG. 2.

Figure 2:
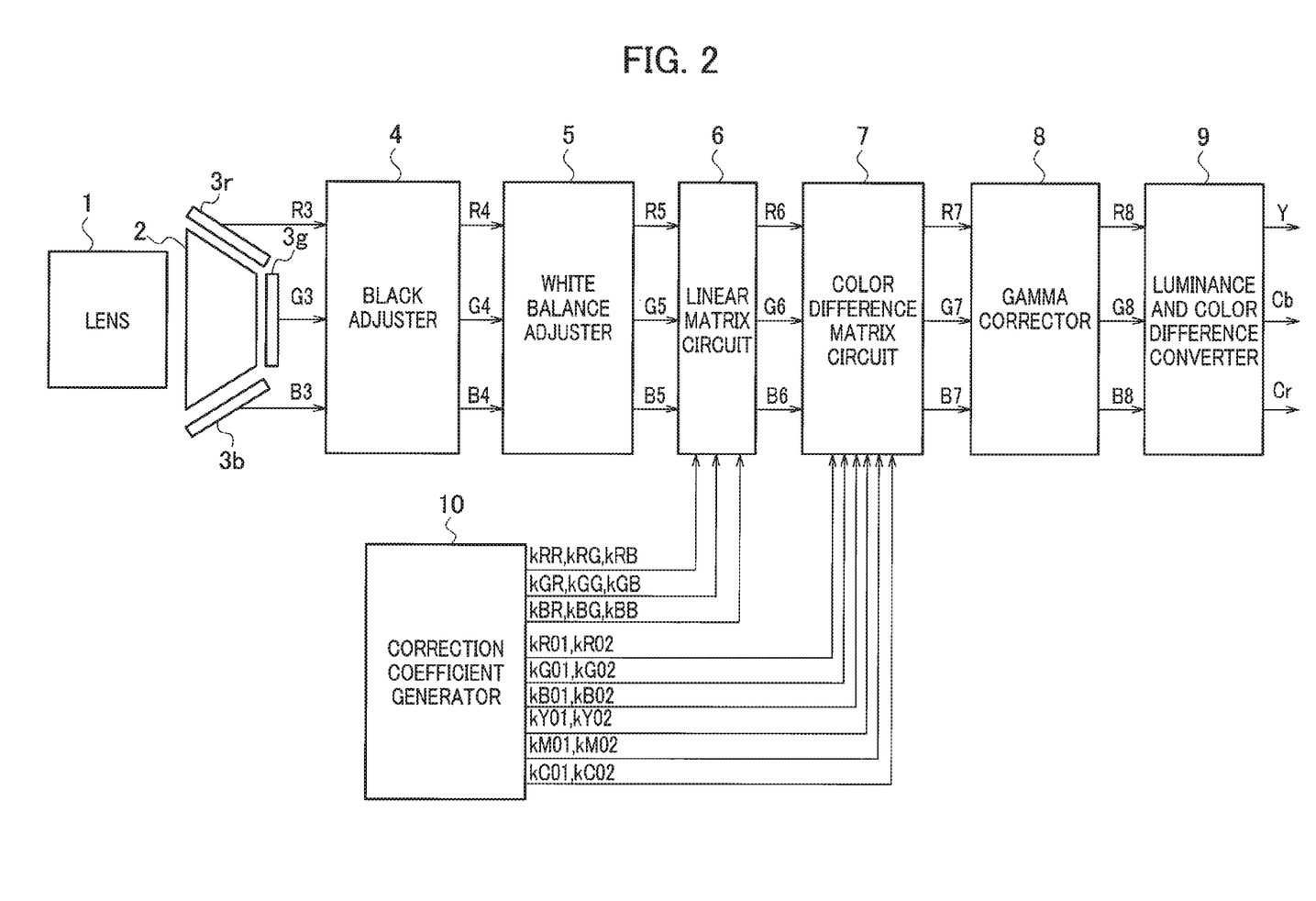
FIG. 2 is a block diagram illustrating an image capturing device including a color correction device having a basic configuration.

In FIG. 2, light from a subject is incident on a prism 2 through a lens 1. The lens 1 includes a plurality of lenses. The prism 2 separates the incident light into wavelength bands of red (R), green (G), and blue (B). Image capturing elements 3r, 3g, and 3b for R, G, and B respectively generate and output an R signal R3, a G signal G3, and a B signal B3. The image capturing elements 3r, 3g, and 3b are CMOS sensors, for example, and output the R signal R3, the G signal G3, and the B signal B3 of digital signals.

Instead of the image capturing elements 3r, 3g, and 3b, a single-plate image capturing element including a color filter represented by a Bayer array may be used. In this case, provided is a demosaic processing circuit that generates video signals of respective frames of an R signal, a G signal, and a B signal based on an image capturing signal in which the R signal, the G signal, and the B signal output from the single-plate image capturing element are mixed in one frame. The prism 2 is not necessary.

A black adjuster 4 adjusts black levels of the R signal R3, the G signal G3, and the B signal B3, thereby outputting an R signal R4, a G signal G4, and a B signal B4. A white balance adjuster 5 adjusts a gain to be multiplied by the R signal R4, the G signal G4, and the B signal B4, and outputs an R signal R5, a G signal G5, and a B signal B5 whose white balances are adjusted.

A linear matrix circuit 6 corrects the R signal R5, the G signal G5, and the B signal B5, thereby outputting an R signal R6, a G signal G6, and a B signal B6.

Specifically, correction coefficients kRR, kRG, and kRB for the R signal, correction coefficients kGR, kGG, and kGB for the G signal, and correction coefficients kBR, kBG, and kBB for the B signal, which are generated by a correction coefficient generator 10, are input to the linear matrix circuit 6. According to a determinant indicated in Equation (1), the linear matrix circuit 6 performs a matrix operation on the R signal R5, the G signal G5, and the B signal B5, and the correction coefficient of 3 rows×3 columns, thereby converting the R signal R5, the G signal G5, and the B signal B5 into the R signal R6, the G signal G6, and the B signal B6.

$$\begin{bmatrix} R6 \\ G6 \\ B6 \end{bmatrix} = \begin{bmatrix} kRR & kRG & kRB \\ kGR & kGG & kGB \\ kBR & kBG & kBB \end{bmatrix} \begin{bmatrix} R5 \\ G5 \\ B5 \end{bmatrix} \quad (1)$$

The correction coefficients kRR, kRG, kRB, kGR, kGG, kGB, kBR, kBG, and kBB are set to values so that a color becomes a natural color when an image of the subject is captured under a light source having a wide-band wavelength including all color components of R, G, and B such as the sun or a halogen lamp. The light source having the wide-band wavelength including all color components of R, G, and B is referred to as a first light source.

The correction coefficient generator 10 can be configured by a central processing unit (CPU) of a microcomputer. Of course, the correction coefficient generator 10 may be configured by units other than the CPU.

In the correction coefficient of 3 rows×3 columns, the correction coefficient kRR is a value significantly greater than the correction coefficients kRG and kRB; the correction coefficient kGG is a value significantly greater than the correction coefficients kGR and kGB; and the correction coefficient kBB is a value significantly greater than the correction coefficients kBR and kBG.

A color difference matrix circuit 7 corrects color saturation of the R signal R6, the G signal G6, and the B signal B6, thereby outputting an R signal R7, a G signal G7, and a B signal B7. A specific operation of the color difference matrix circuit 7 will be described as follows.

Correction coefficients kR01 and kR02, kG01 and kG02, kB01 and kB02, kY01 and kY02, kM01 and kM02, and kC01 and kC02 generated by the correction coefficient generator 10 are input to the color difference matrix circuit 7.

The correction coefficients kR01 and kR02, kG01 and kG02, and kB01 and kB02 are correction coefficients for respectively correcting the saturation of R, G, and B. The correction coefficients kY01 and kY02, kM01 and kM02, and kC01 and kC02 are correction coefficients for respectively correcting the saturation of yellow (Ye), magenta (Mg), and cyan (Cy).

Figure 3:
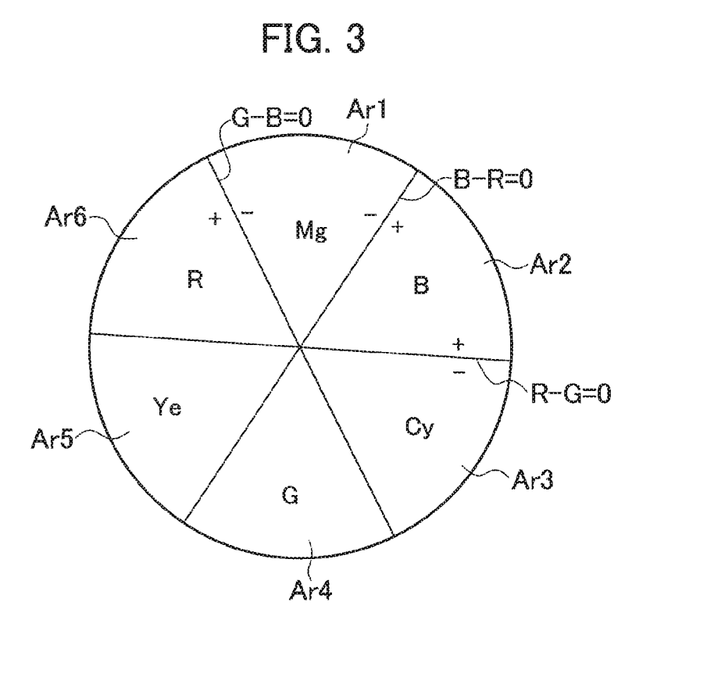
FIG. 3 is a diagram illustrating a region of color space when a color difference matrix circuit 7 in FIGS. 1 and 2 corrects an R signal, a G signal, and a B signal.

FIG. 3 illustrates color space in a plan view in which a circumferential direction of a circle indicates a hue and a radial direction indicates the saturation. The color space is divided into six with a straight line indicating G−B=0, B−R=0, and R−G=0. Six regions are defined as Ar1 to Ar6. In the regions Ar1 to Ar6, respective colors of Mg, B, Cy, C, Ye, and R, are respectively present.

The color difference matrix circuit 7 corrects the R signal R6, the C signal G6, and the B signal B6 in pixel units depending on where each pixel is located in the regions Ar1 to Ar6 illustrated in FIG. 3. A location of each pixel in the regions Ar1 to Ar6 is determined by positive and negative signs of respective difference values (G6−B6), (B6−R6), and (R6−G6) of the R signal R6, the G signal G6, and the B signal B6.

When the pixel is located in the regions Ar1 to Ar6, the color difference matrix circuit 7 respectively generates the R signal R7 based on Equations (2) to (7), generates the G signal G7 based on Equations (8) to (13), and generates the B signal B7 based on Equations (14) to (19).

Region Ar1: $R7=R6+\{kR01(R6-B6)+kM01(B6-G6)\}$ (2)

Region Ar2: $R7=R6+\{kM01(R6-G6)-kB01(B6-R6)\}$ (3)

Region Ar3: $R7=R6+\{-kB01(B6-G6)-kC01(G6-R6)\}$ (4)

Region Ar4: $R7=R6+\{-kG01(G6-B6)-kC01(B6-R6)\}$ (5)

Region Ar5: $R7=R6+\{kY01(R6-B6)-kG01(G6-R6)\}$ (6)

Region Ar6: $R7=R6+\{kR01(R6-G6)+kY01(G6-B6)\}$ (7)

Region Ar1: $G7=G6+\{-kR02(R6-B6)-kM02(B6-G6)\}$ (8)

Region Ar2: $G7=G6+\{-kB01(B6-R6)-kM02(R6-G6)\}$ (9)

Region Ar3: $G7=G6+\{kC02(G6-R6)-kB01(B6-G6)\}$ (10)

Region Ar4: $G7=G6+\{kG02(G6-B6)+kC02(B6-R6)\}$ (11)

Region Ar5: $G7=G6+\{kG02(G6-R6)+kY01(R6-B6)\}$ (12)

Region Ar6: $G7=G6+\{kY01(G6-B6)-kR02(R6-G6)\}$ (13)

Region Ar1: $B7=B6+\{kM01(B6-G6)-kR02(R6-B6)\}$ (14)

Region Ar2: $B7=B6+\{kB02(B6-R6)+kM01(R6-G6)\}$ (15)

Region Ar3: $B7=B6+\{kB02(B6-G6)+kC02(G6-R6)\}$ (16)

Region Ar4: $B7=B6+\{kC02(B6-R6)-kG01(G6-B6)\}$ (17)

Region Ar5: $B7=B6+\{-kG01(G6-R6)-kY02(R6-B6)\}$ (18)

Region Ar6: $B7=B6+\{-kR02(R6-G6)-kY02(G6-B6)\}$ (19)

In Equations (2) to (7), a value added to the R signal R6 is referred to as a first saturation correction value; in Equations (8) to (13), a value added to the G signal G6 is referred to as a second saturation correction value; and in Equations (14) to (19), a value added to the B signal B6 is referred to as a third saturation correction value.

In order to increase or decrease the saturation of each color, the correction coefficients kR01 and kR02, kG01 and kG02, kB01 and kB02, kY01 and kY02, kM01 and kM02, and kC01 and kC02 are positive values or negative values. The correction coefficients kR01 and kR02, kG01 and kG02, kB01 and kB02, kY01 and kY02, kM01 and kM02, and kC01 and kC02 are set to values such that the color becomes the natural color when the image of the subject is captured under the first light source.

A gamma corrector 8 performs the gamma correction on the R signal R7, the G signal G7, and the B signal B7, thereby outputting an R signal R8, a G signal G8, and a B signal B8. A luminance and color difference converter 9 converts the R signal R8, the G signal G8, and the B signal B8 into a luminance signal Y and color difference signals Cb and Cr by using a well-known conversion formula, thereby outputting the converted signals.

In FIG. 2, the video signals (the R signal R3, the G signal G3, and the B signal B3) output from the image capturing elements 3r, 3g, and 3b are not an ideal spectral characteristic corresponding to the human eyes. This is because a characteristic of an optical system such as the prism 2 and a spectral sensitivity characteristic of the image capturing elements 3r, 3q, and 3b are different from a characteristic of the human eyes. When the color is not corrected, the luminance signal Y and the color difference signals Cb and Cr are displayed on a monitor which is not illustrated, and a color of the subject viewed by a human is different from an actual color of the subject.

Therefore, the color is corrected by the linear matrix circuit 6 and the color difference matrix circuit 7 so as to match color space of the monitor, whereby the color of the subject when viewed by the human displayed on the monitor can be caused to be close to the actual color of the subject.

Figure 4:
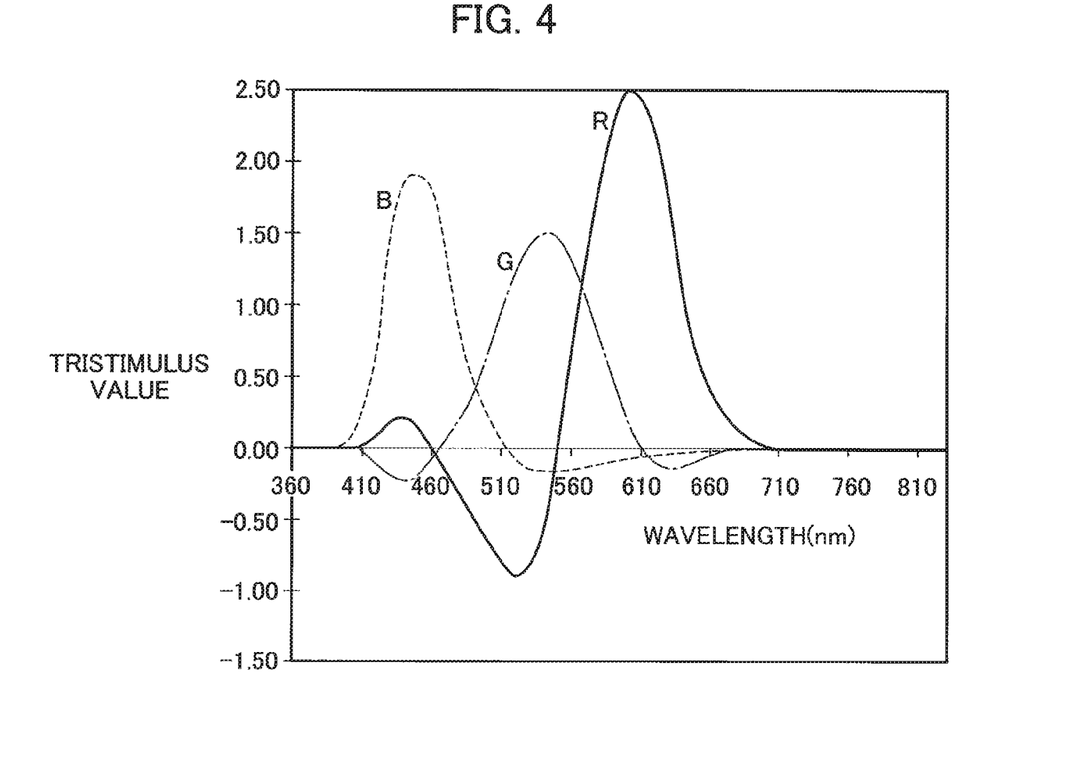
FIG. 4 is a characteristic diagram illustrating a characteristic obtained by converting a spectral characteristic of RGB close to the human eyes into color space of REC709 of the ITU standard.

Typically, a spectral characteristic of RGB close to a characteristic when viewed by the human is a characteristic known by CIE (1931) 2-deg color matching functions. FIG. 4 shows a characteristic obtained by converting the characteristic into color space of REC709 of an international telecommunication union (ITU) standard. In FIG. 4, a horizontal axis represents a wavelength, a vertical axis represents a tristimulus value, a solid line represents a characteristic of the R signal, a one-dot chain line represents a characteristic of the G signal, and a broken line represents a characteristic of the B signal.

If a total characteristic of RGB of the image capturing device is close to that in FIG. 4 by the linear matrix circuit 6 and the color difference matrix circuit 7, the color when seen by the human and the actual color of the subject can be close to each other. However, in the image capturing device, even if the R signal, the G signal, and the B signal are corrected to be negative, the signals are clipped to 0 in a negative wavelength region.

In ITU 709, it is standardized that the luminance and color difference converter 9 generates the luminance signal Y based on Equation (20). Values of R, G, and B in Equation (20) are the values of the R signal R8, the G signal G8, and the B signal B8 output from the gamma corrector 8 in FIG. 2.

$$Y=0.2126R+0.7152G+0.0722B \quad (20)$$

When the image of the subject is captured under the first light source, even if the total characteristic of RGB is caused to be close to that in FIG. 4 by the linear matrix circuit 6 and the color difference matrix circuit 7, the luminance signal Y can be generated based on Equation (20). This is because the light with which the subject is irradiated under the first light source has the wide-band wavelength including all color components of R, G, and B.

However, sometimes, the image of the subject is captured under a light source having a narrow-band wavelength including only the color component of B such as the blue LED light source. In this case, the subject may be irradiated with the light including only the color component of B, or the light of the color component of B and light having slightly another color component from another light source may be mixed. Such image capturing in a state where the color component of B is a main component is referred to as image capturing under a second light source.

When the image of the subject is captured under the second light source, even if the total characteristic of RGB is intended to be close to that in FIG. 4 by the linear matrix circuit 6 and the color difference matrix circuit 7, the luminance signal Y cannot be appropriately generated. This is due to the following reason. A large portion of a wavelength range of the light with which the subject is irradiated is a wavelength range of B, and a difference between the B signal, and the R signal and the G signal is significantly large. When the total characteristic of RGB is intended to be close to that in FIG. 4, the R signal and the G signal are corrected in a negative direction and clipped to 0, and the value of the luminance signal Y becomes extremely small, or the value of the luminance signal Y becomes 0 and thus the luminance signal Y is not generated.

In order to cause the total characteristic of RGB to be close to that in FIG. 4 by the linear matrix circuit 6, the correction coefficient kRR in the determinant indicated in Equation (1) is set to a positive value and the correction coefficient kRG therein is set to be a negative value. The correction coefficient kRB may be positive or negative depending on an optical characteristic or the like of a previous stage. The correction coefficient kGG is set to a positive value, and the correction coefficients kGR and kGB are set to negative values. As described above, since the correction coefficient used in the linear matrix circuit 6 includes the negative value, the R signal R5 or the G signal G5 is corrected in the negative direction and clipped to 0 under the second light source, and thus the luminance signal Y is not appropriately generated.

Accordingly, an unnatural image having no gradation of luminance in blue is caused under the second light source. A problem occurred under the LED light source described above is generated not only under the blue LED light source but also under a third light source having a narrow-band wavelength mainly including the color component of R such as a red LED light source, or similarly under a case where both the blue LED light source and the red LED light source exist and thus the subject is irradiated with magenta light.

Figure 1:
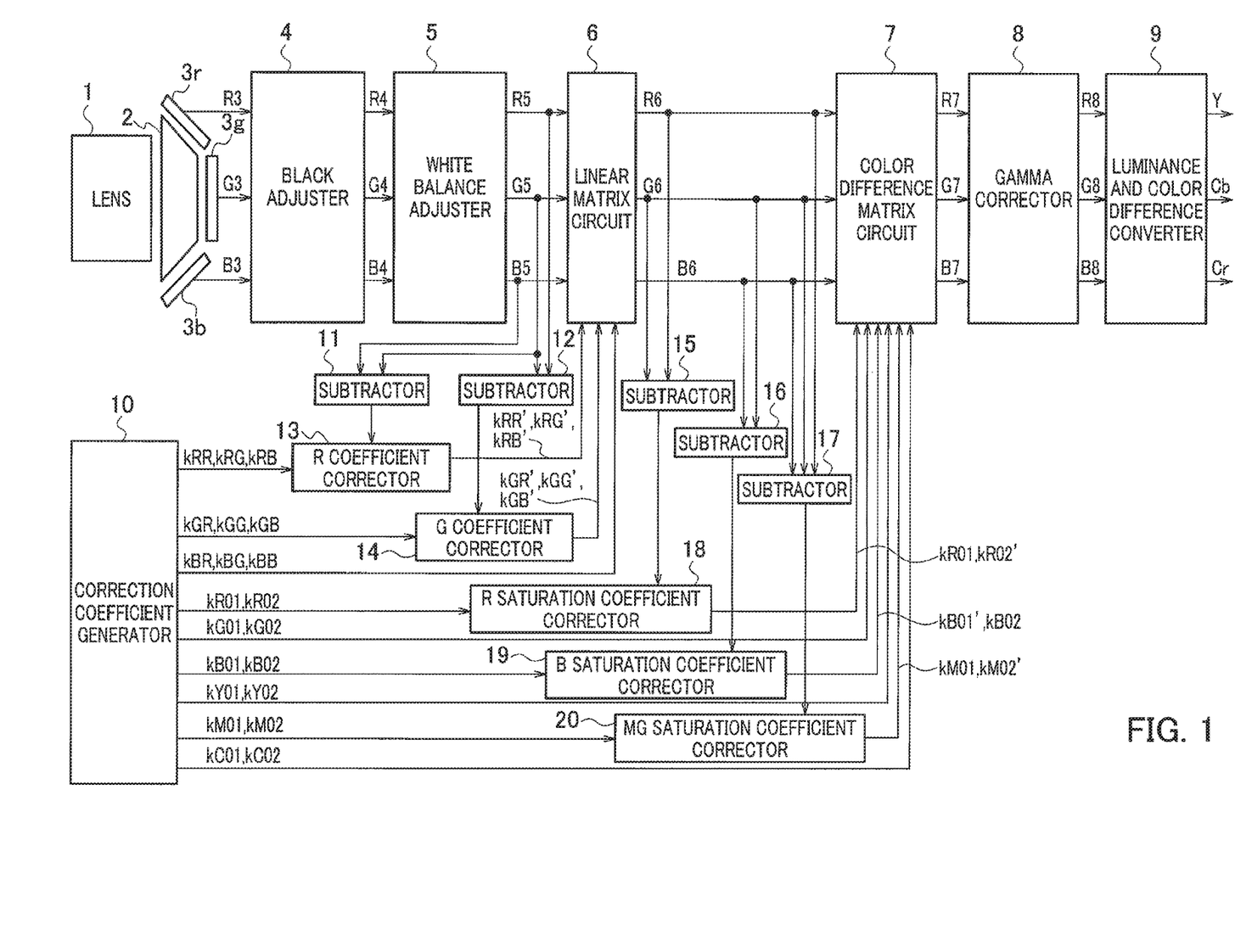
FIG. 1 is a block diagram illustrating an image capturing device including a color correction device according to one or more embodiments.

Next, referring to FIG. 1, configurations and operations of the color correction device according to one or more embodiments that causes the linear matrix circuit 6 and the color difference matrix circuit 7 to be operated so as to solve the problem occurring under the LED light source will be described. In FIG. 1, the same parts as those in FIG. 2 will be denoted by the same reference signs, and the description thereof will be omitted.

In FIG. 1, a subtractor 11 subtracts the G signal G5 from the B signal B5 output from the white balance adjuster 5 to generate a difference value (B5−G5) for each pixel, after which the generated difference value is supplied to the R coefficient corrector 13. The subtractor 12 subtracts the G signal G5 from the R signal R5 output from the white balance adjuster 5 to generate a difference value (R5−G5) for each pixel, after which the generated difference value is supplied to a G coefficient corrector 14.

The R coefficient corrector 13 corrects magnitudes of the correction coefficients kRR, kRG, and kRB for the R signal in response to a magnitude of the difference value (B5−G5). The G coefficient corrector 14 corrects magnitudes of the correction coefficients kGR, kGG, and kGB for the G signal in response to a magnitude of the difference value (R5−G5).

Specifically, when the difference value (B5−G5) exceeds a predetermined threshold th, the R coefficient corrector 13 attenuates the magnitude of the correction coefficient for correcting the magnitudes of the correction coefficients kRR, kRG, and kRB at a rate of an attenuation coefficient slope_BG. Here, a case where the precision of attenuation is 10 bits is described as an example. When a value of (B5−G5)−th is defined as A, A=0 when (B5−G5)<th or B5<G5. A value of slope_BG×A/1024 is defined as slope.

Note that the attenuation coefficient indicates an inclination of an inclined portion of the correction coefficient generated by the R coefficient corrector 13, the G coefficient corrector 14, and an R saturation coefficient corrector 18, a B saturation coefficient corrector 19, and an Mg saturation coefficient corrector 20 which will be described later.

Figure 5:
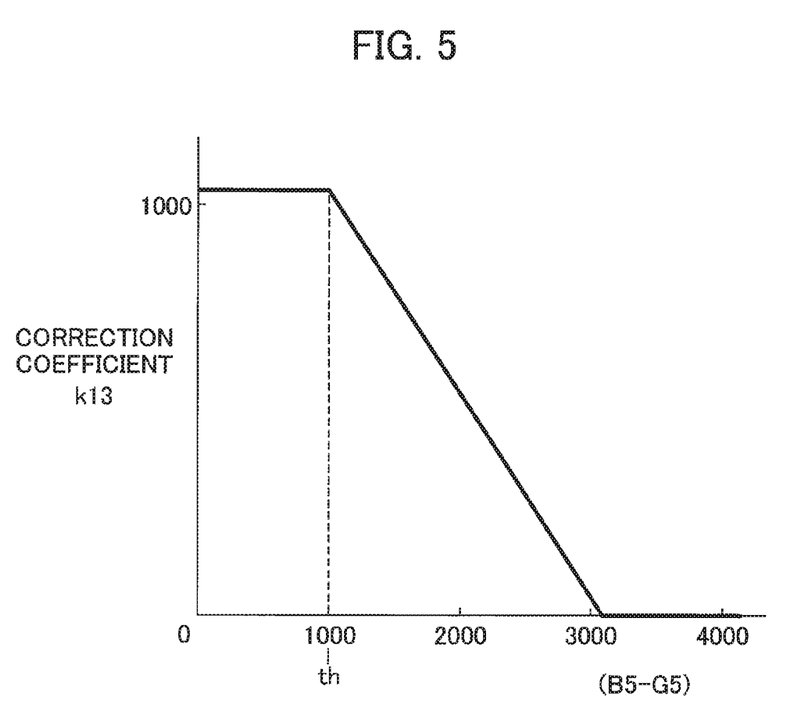
FIG. 5 is a characteristic diagram illustrating a correction coefficient k13 for correcting magnitudes of correction coefficients kRR, kRG, and kRB for the R signal with an R coefficient corrector 13 in FIGS. 1 and 2.

When the correction coefficient for correcting the magnitudes of the correction coefficients kRR, kRG, and kRB for the R signal is defined as k13, the R coefficient corrector 13 normalizes k13=0 when k13=1024−slope and slope≥1024. FIG. 5 shows the correction coefficient k13.

The R coefficient corrector 13 corrects the correction coefficients kRR, kRG, and kRB as indicated in Equations (21) to (23), thereby generating correction coefficients kRR', kRG', and kRB'.

$$kRR'=(kRR-1)\times k13/1024+1 \quad (21)$$

$$kRG'=kRG\times k13/1024 \quad (22)$$

$$kRB'=kRB\times k13/1024 \quad (23)$$

As can be sees from the characteristic of the correction coefficient k13 illustrated in FIG. 5 and Equations (21) to (23), when the difference value (B5−G5) exceeds the threshold th, the R coefficient corrector 13 sets the correction coefficients kRG and kRB to be close to 0 and sets the correction coefficient kRR to be close to 1 as the difference value (B5−G5) increases. The R coefficient corrector 13 supplies the correction coefficients kRR', kRG', and kRB' generated as described above to the linear matrix circuit 6.

In the same manner, when the difference value (R5−G5) exceeds the predetermined threshold th, the G coefficient corrector 14 attenuates the correction coefficient for correcting the magnitudes of the correction coefficients kGR, kGG, and kGB at a rate of an attenuation coefficient slope_RG. When a value of (R5−G5)−th is defined as A, A=0 when (R5−G5)<th or when R5<G5. A value of slope_RG×A/1024 is defined as slope.

When the correction coefficient for correcting the magnitudes of the correction coefficients kGR, kGG, and kGB for the G signal is defined as k14, the G coefficient corrector 14 normalizes k14=0 when k14=1024−slope and slope≥1024. The correction coefficient k14 has the same characteristic as that of the correction coefficient k13 shown in FIG. 5. However, the threshold th and the attenuation coefficient slope_RG in the correction coefficient k14 are not necessarily the same values as those of the threshold th and the attenuation coefficient slope_BG in the correction coefficient k13. The threshold th and the attenuation coefficient slope_RG are set in association with the correction coefficient k14.

The G coefficient corrector 14 corrects the correction coefficients kGR, kGG, and kGB as indicated in Equations (24) to (26), thereby generating correction coefficients kGR', kGG', and kGB'.

$$kGR'=kGR\times k14/1024 \quad (24)$$

$$kGG'=(kGG-1)\times k14/1024+1 \quad (25)$$

$$kGB'=kGB\times k14/1024 \quad (26)$$

As can be seen from the correction coefficient k14 and Equations (24) to (26), when the difference value (R5−G5) exceeds the threshold th, the G coefficient corrector 14 sets the correction coefficients kGR and kGB to be close to 0 and sets the correction coefficient kGG to be close to 1 as the difference value (R5−G5) increases. The G coefficient corrector 14 supplies the correction coefficients kGR', kGG', and kGB' generated as described above to the linear matrix circuit 6.

According to the determinant indicated in Equation (1), the linear matrix circuit 6 converts the R signal R5 into the R signal R6 by using the correction coefficients kRR', kRG', and kRB' supplied from the R coefficient corrector 13 instead of the correction coefficients kRR, kRG, and kRB. According to the determinant indicated in Equation (1), the linear matrix circuit 6 converts the G signal G5 into the G signal G6 by using the correction coefficients kGR', kGG', and kGB' supplied from the G coefficient corrector 14 instead of the correction coefficients kGR, kGG, and kGB.

According to the determinant indicated in Equation (1), the linear matrix circuit 6 converts the B signal B5 into the B signal B6 by using the correction coefficients kBR, kBG, and kBB supplied from the correction coefficient generator 10 as they are.

In FIG. 1, the subtractor 15 subtracts the G signal G6 from the R signal R6 output from the linear matrix circuit 6 to generate the difference value (R6−G6) for each pixel, after which the generated difference value is supplied to the R saturation coefficient corrector 18. The subtractor 16 subtracts the G signal G6 from the B signal B6 output from the linear matrix circuit 6 to generate the difference value (B6−G6) for each pixel, after which the generated difference value is supplied to the B saturation coefficient corrector 19. The subtractor 16 subtracts the G signal G6 from a larger signal RBmax out of the R signal R6 and the B signal B6 to generate a difference value (RBmax−G6) for each pixel, after which the generated difference value is supplied to the Mg saturation coefficient corrector 20.

The R saturation coefficient corrector 18 corrects the magnitude of the correction coefficient kR02 in accordance with the magnitude of the difference value (R6−G6). The B saturation coefficient corrector 19 corrects the magnitude of the correction coefficient kB01 in accordance with the magnitude of the difference value (B6−G6). The Mg saturation coefficient corrector 20 corrects the magnitude of the correction coefficient kM02 in accordance with the magnitude of the difference value (RBmax−G6).

Specifically, when the difference value (R6−G6) exceeds the predetermined threshold th, the R saturation coefficient corrector 18 attenuates the correction coefficient for correcting the magnitude of the correction coefficient kR02 at the rate of the attenuation coefficient slope_RG. When a value of (R6−G6)−th is defined as A, A=0 when (R6−G6)<th or when R6<G6. The value of slope_RG×A/1024 is defined as slope.

When the correction coefficient for correcting the magnitude of the correction coefficient kR02 for correcting the saturation of the R signal is defined as k18, the R saturation coefficient corrector 18 normalizes k18=0 when k18=1024−slope and slope≥1024. The R saturation coefficient corrector 18 corrects the correction coefficient kR02 as indicated in Equation (27) or (28), thereby generating a correction coefficient kR02'.

$$kR02'=kR02\times k18/1024 \text{ (when } kR02>0) \quad (27)$$

$$kR02'=kR02 \text{ (other than a case when } kR02>0) \quad (28)$$

The correction coefficient k18 has the same characteristic as that in FIG. 5, but the threshold th and the attenuation coefficient slope_RG in the correction coefficient k18 are not necessarily the same values as those of the threshold th and the attenuation coefficient slope_BG in the correction coefficient k13 or the threshold th and the attenuation coefficient slope_RG in the correction coefficient k14. The threshold th and the attenuation coefficient slope_RG are set in association with the correction coefficient k18.

As can be seen from Equations (27) and (28), when the correction coefficient kR02 is a positive value, the R saturation coefficient corrector 18 sets the correction coefficient kR02 to be close to 0 as the difference value (R6−G6) increases, and when the correction coefficient kR02 is a negative value, the correction coefficient kR02 is used as it is regardless of the magnitude of the difference value (R6−G6). The R saturation coefficient corrector 18 supplies the correction coefficient kR01 and the correction coefficient kR02′ corrected as described above to the color difference matrix circuit 7. In the same manner, when the difference value (B6−G6) exceeds the predetermined threshold th, the B saturation coefficient corrector 19 attenuates the correction coefficient for correcting the magnitude of the correction coefficient kB01 at the rate of the attenuation coefficient slope_BG. When a value of (B6−G6)−th is defined as A, A=0 when (B6−G6)<th or when B6<G6. The value of slope_BG×A/1024 is defined as slope.

When a correction coefficient for correcting the magnitude of the correction coefficient kB01 for correcting the saturation of the B signal is defined as k19, the B saturation coefficient corrector 19 normalizes k19=0 when k19=1024−slope and slope≥1024. The B saturation coefficient corrector 19 corrects the correction coefficient kB01 as indicated in Equation (29) or (30), thereby generating a correction coefficient kB01′.

$$kB01'=kB01 \times k19/1024 \text{ (when } kB01>0) \quad (29)$$

$$kB01'=kB01 \text{ (other than a case when } kB01>0) \quad (30)$$

The correction coefficient k19 has the same characteristic as that in FIG. 5, and the threshold th and the attenuation coefficient slope_BG in the correction coefficient k19 are not necessarily the same values as those of the threshold th and the attenuation coefficient slope_RG in the correction coefficient k18. The threshold th and the attenuation coefficient slope_BG are set an association with the correction coefficient k19.

As can be seen from Equations (29) and (30), when the correction coefficient kB01 is a positive value, the B saturation coefficient corrector 19 sets the correction coefficient kB01 to be close to 0 as the difference value (B6−G6) increases, and alternatively when the correction coefficient kB01 is a negative value, the correction coefficient kB01 is used as it is regardless of the magnitude of the difference value (B6−G6). The B saturation coefficient corrector 19 supplies the correction coefficient kB01′ corrected as described above and the correction coefficient kB02 to the color difference matrix circuit 7.

When the difference value (RBmax−G6) exceeds the predetermined threshold th, the Mg saturation coefficient corrector 20 attenuates the correction coefficient for correcting the magnitude of the correction coefficient kM02 at a rate of an attenuation coefficient slope_RBmax. When a value of (RBmax−G6)−th is defined as A, A=0 when (RBmax−G6)<th or when RBmax<G6. A value of slope_RBmax×A/1024 is defined as slope.

When the correction coefficient for correcting the magnitude of the correction coefficient kM02 for correcting the saturation of a Mg signal is defined as k20, the Mg saturation coefficient corrector 20 normalizes k20=0 when k20=1024−slope and slope≥1024. The Mg saturation coefficient corrector 20 corrects the correction coefficient kM02 as indicated in Equation (31) or (32), thereby generating a correction coefficient kM02′.

$$kM02'=kM2 \times k20/1024 \text{ (when } kM02>0) \quad (31)$$

$$kM02'=kM02 \text{ (other than a case where } kM02>0) \quad (32)$$

The correction coefficient k20 has the same characteristic as that in FIG. 5, and the threshold th and the attenuation coefficient slope_RBmax in the correction coefficient k20 are not necessarily the same values as those of the threshold th and the attenuation coefficient slope_RG in the correction coefficient k18, and the threshold th and the attenuation coefficient slope_BG in the correction coefficient k19. The threshold th and the attenuation coefficient slope_RBmax are set in association with the correction coefficient k20.

As can be seen from. Equations (31) and (32), when the correction coefficient kM02 is a positive value, the Mg saturation coefficient corrector 20 sets the correction coefficient kM02 to be close to 0 as the difference value (RBmax−G6) increases, and alternatively when the correction coefficient kM02 is a negative value, the correction coefficient kM02 is used as it is regardless of the magnitude of the difference value (RBmax−G6). The Mg saturation coefficient corrector 20 supplies the correction coefficient kM01 and the correction coefficient kM02′ corrected as described above to the color difference matrix circuit 7.

According to Equations (2) to (19), the color difference matrix circuit 7 generates the R signal R7, the G signal G7, and the B signal B7 by using the correction coefficients kR01 and kR02′, kG01 and kG02, kB01′ and kB02, kY01 and kY02, kM01 and kM02′, and kC01 and kC02.

As can be seen from Equations (8) to (10) and (13), when the correction coefficients kR02, kB01, and kM02 are positive values, the correction coefficients kR02, kB01, and kM02 act so as to reduce the luminance signal Y by reducing the G signal G7 which is a main component of the luminance signal Y. On the other hand, when the correction coefficients kR02, kB01, and kM02 are negative values, the correction coefficients kR02, kB01, and kM02 act so as to increase the luminance signal Y by increasing the G signal G7.

Normally, in order to set the total characteristic of RGB to be close to that in FIG. 4 when the image capturing is performed under the first light source, the correction coefficients kR02, kB01, and kM02 are positive values.

In the image capturing device including the color correction device configured as described above, when an image of a normal subject is captured under the first light source, the difference value (B5−G5) and the difference value (R5−G5) do not exceed the threshold th. Therefore, the linear matrix circuit 6 converts the R signal R5, the G signal G5, and the B signal B5 into the R signal R6, the G signal G6, and the B signal B6 so that a color becomes the natural color when the image of the subject is captured under the first light source.

The color difference matrix circuit 7 adds or subtracts the color difference components set for each of the regions Ar1 to Ar6 to or from the R signal R6, the G signal G6, and the B signal B6 based on Equations (2) to (19). When the correction coefficients kR02, kB01, and kM02 are positive values under the first light source, the second saturation correction value added to the G signal G6 (particularly, the second saturation correction value in the regions Ar1 and Ar2) is a negative value. Accordingly, the color difference matrix circuit 7 corrects the color to attenuate the G signal G7 so that the color becomes a more natural color under the first light source.

In the second light source, the difference value (B5–G5) and the difference value (R5–G5) exceed the threshold value th. Accordingly, the linear matrix circuit 6 performs the matrix operation on the R signal R5, the G signal G5 and the B signal B5, and correction coefficients including the correction coefficients kRR', kRG', kRB', kGR', kGG', kGB', kBR, kBG, and kBB. Accordingly, the linear matrix circuit 6 generates the R signal R6, the G signal G6, and the B signal B6 suitable when the image of the subject is captured under the second light source.

Since the difference value (B5–G5) exceeds the threshold th under the second light source, only the B signal B6 becomes a large value, and the R signal R6 and the G signal G6 become small values. Accordingly, the difference values (B6–G6) and (RBmax–G6) become large values. When the correction coefficient kB01 is positive, the B saturation coefficient corrector 19 generates the correction coefficient kB01' that sets the correction coefficient kB01 to a small value or 0. When the correction coefficient kM02 is positive, the Mg saturation coefficient corrector 20 generates the correction coefficient kM02' that sets the correction coefficient kM02 to a small value or 0.

The correction coefficient kB01' is used when the R signal R7 is generated by using Equation (3) in the region Ar3, and when the R signal R7 is generated by using Equation (4) in the region Ar3. At this time, the difference value (B6–R6) in Equation (3) and the difference value (B6–G6) in Equation (4) are large values, but since the correction coefficient kB01' is corrected to a small value or 0, the terms of –kB01 (B6–R6) in Equation (3) and –kB01 (B6–G6) in Equation (4) become small values or 0.

Since the values of the difference values (R6–G6) and (G6–R6) are small values, the terms of kM01 (R6–G6) in Equation (3) and –kC01 (G6–R6) in Equation (4) become small values or 0.

Therefore, the R signal R7 in the regions Ar1 and Ar3 has almost the same value as that of the R signal R6, and is not corrected in the negative direction.

The correction coefficients kB01' and kM02' are used when the G signal G7 is generated by using Equation (9) in the region Ar2. At this time, since the correction coefficient kM02' is corrected to a small value or 0 and the difference value (R6–G6) is small, the term of –kM02 (R6–G6) becomes a small value or 0. The difference value (B6–R6) is a large value, but since the correction coefficient kB01' is corrected to a small value or 0, the term of –kB01 (B6–R6) becomes a small value or 0.

Accordingly, the G signal G7 in the region Ar2 becomes almost the same value as that of the G signal G6, and is not corrected in the negative direction.

As can be seen from Equation (20), when the G signal G7 does not become a negative value, preferably when the R signal R7 and the G signal G7 do not become a negative value, the luminance and color difference converter 9 can generate the luminance signal Y in accordance with the B signal B8 based on the B signal B7 having a large value.

According to the color correction device configured as above, under the second light source, the G signal G7 is not corrected in the negative direction by the second saturation correction value added to the G signal G6, and the R signal R7 is also not corrected in the negative direction by the first saturation correction value added to the R signal R6. Accordingly, the image capturing device can generate the luminance signal Y, and can obtain a natural image having a gradation.

Since the difference value (R5–G5) exceeds the threshold th under the third light source, only the R signal R6 becomes a large value, and thus the G signal G6 and the B signal B6 become small values. Accordingly, the difference values (R6–G6) and (RBmax–G6) become large values. When the correction coefficient kR02 is positive, the R saturation coefficient corrector 18 generates the correction coefficient kR02' that sets the correction coefficient kR02 to a small value or 0. The operation of the Mg saturation coefficient corrector 20 is the same as that of the case under the second light source.

The correction coefficient kR02' used when the G signal G7 is generated by using Equations (8) and (13) in the regions Ar1 and Ar6. In Equation (8), the difference value (R6–B6) is a large value, but since the correction coefficient kR02' is corrected to a small value or 0, the term of –kR02 (R6–B6) becomes a small value or 0, and the term of –kM02 (B6–G6) becomes a small value or 0 either.

In Equation (13), the difference value (R6–G6) is a large value, but since the correction coefficient kR02' is corrected to a small value or 0, the term of –kR02 (R6–G6) also becomes a small value or 0, and the term of kY01 (G6–B6) becomes a small value or 0.

Therefore, the G signal G7 in the regions Ar1 and Ar6 becomes almost the same value as that of the G signal G6, and is not corrected in the negative direction. In the same manner, the luminance and color difference converter 9 can generate the luminance signal Y in accordance with the B signal B8 based on the B signal B7 having a large value. Accordingly, the image capturing device including the color correction device configured as described above can obtain a natural image having a gradation even under the third light source.

In the same manner, even when both the blue LED light source and the red LED light source exist and the subject is irradiated with magenta light, since the luminance and color difference converter 9 can generate the luminance signal Y, the image capturing device can obtain the natural image having the gradation.

When the correction coefficients kR02, kB01, and kM02 are negative values, even in any of the cases where both the blue LED light source and the red LED light source exist and the subject is irradiated with magenta light under the second light source and the third light source, the values of the correction coefficients kR02, kB01, and kM02, which are negative values, are maintained as they are. Therefore, the R signal R7 and the G signal G7 are not corrected in the negative direction, and the luminance and color difference converter 9 can generate the luminance signal Y.

In FIG. 1, when the correction coefficient generator 10 is configured by a CPU, each threshold th and attenuation coefficient of the correction coefficients k13, k14, and k18 to k20 can be individually set by the CPU. The correction coefficient generator 10 may set the threshold th and the attenuation coefficient in accordance with a color temperature of the light from the light source.

The present invention is not limited to one or more embodiments described above, and can be variously modified within a range not departing from the scope of the present invention. The characteristics of the correction coefficients k13, k14, and k18 to k20 are not limited to the characteristics in which the coefficient value gradually decreases linearly when the difference value exceeds the threshold th as illustrated in FIG. 5. The characteristics may be formed in such a manner that the coefficient value gradually decreases in a curved manner.

When the image capturing device or the color correction device illustrated in FIG. 1 is configured, how to use hardware and software (a computer program) separately is optional. In FIG. 1, portions other than a lens 1, a prism 2, and image capturing elements 3r, 3g, and 3b may be configured by a circuit by hardware, may be configured by software, and may be configured by a mixture of both.

When the image capturing device illustrated in FIG. 1 is not used under the third light source and if it is sufficient to assume only a case where the image capturing device is used under the first and second light sources, the G coefficient corrector 14 and the R saturation coefficient corrector 18 may be omitted. When the image capturing device illustrated in FIG. 1 is not used under the second light source, and if it is sufficient to assume only a case where the image capturing device is used under the first and third light sources, the R coefficient corrector 13 and the B saturation coefficient corrector 19 may be omitted.

One or more embodiments described above has a configuration including the linear matrix circuit 6 and the color difference matrix circuit 7, but a configuration in which the color difference matrix circuit 7 is omitted may be adopted. In this case, the subtractors 15 to 17, the R saturation coefficient corrector 18, the B saturation coefficient corrector 19, and the Mg saturation coefficient corrector 20 are also omitted. As described above, since the color difference matrix circuit 7 corrects the color saturation of the R signal R6, the G signal G6, and the B signal B6 output from the linear matrix circuit 6, it is sufficiently effective even if only the linear matrix circuit 6 is provided and the R signal R5, the G signal G5, and the B signal B5 are corrected.

The configuration and operation of the color correction device according to one or more embodiments described above are summarized as follows. The color correction device includes the linear matrix circuit 6. The R signal R5, the G signal G5, and the B signal B5 are respectively defined as a first R signal, a first G signal, and a first B signal. The R signal R6, the G signal G6, and the B signal B6 are respectively defined as a second R signal, a second G signal, and a second B signal.

In the correction coefficient of 3 rows×3 columns used in the linear matrix circuit 6, the correction coefficients kRR, kRG, and kRB are respectively defined as first to third correction coefficients, the correction coefficients kGR, kGG, and kGB are respectively defined as fourth to sixth correction coefficients, and the correction coefficients kBR, kBG, and kBB are respectively defined as seventh to ninth correction coefficients. The linear matrix circuit 6 performs the matrix operation on the first R signal, the first G signal, and the first B signal with the correction coefficient of 3 rows×3 columns, thereby generating the second R signal, the second G signal, and the second B signal.

The R coefficient corrector 13 performs the correction such that, when a first difference value obtained by subtracting the first G signal from the first B signal exceeds a first threshold, a first correction coefficient to be multiplied by the first R signal is caused to be close to 1 as the first difference value increases, and the second and third correction coefficients to be respectively multiplied by the first G signal and the first B signal are caused to be close to 0. When the image capturing device captures the image of the subject under the second light source, the first difference value exceeds the first threshold.

According to the above-described configuration and operation, even when the image capturing device captures the image of the subject under the second light source, a natural image having a gradation can be obtained.

A color correction device preferably further includes the G coefficient corrector 14 that performs the correction such that, when the second difference value obtained by subtracting the first G signal from the first R signal exceeds a second threshold, the fifth correction coefficient to be multiplied by the first G signal is caused to be close to 1 and the fourth and sixth correction coefficients to be respectively multiplied by the first R signal and the first B signal are caused to be close to 0. When the image capturing device captures the image of the subject under the third light source, the second difference value exceeds the second threshold.

It is desirable that the color correction device further includes the color difference matrix circuit 7 for correcting the color saturation of the second R signal, the second G signal, and the second B signal.

A plurality of correction coefficients used in Equations (2) to (7) are defined as a tenth correction coefficient; a plurality of correction coefficients used in Equations (8) to (13) are defined as an eleventh correction coefficient; and a plurality of correction coefficients used in Equations (14) to (19) are defined as a twelfth correction coefficient. The R signal R7, the G signal G7, and the B signal B7 are defined as a third R signal, a third G signal, and a third B signal.

The color difference matrix circuit 7 generates the third R signal by adding the first saturation correction value obtained by multiplying the difference value of a combination of any two of the second R signal, the second G signal, and the second B signal by the tenth correction coefficient to the second R signal.

The color difference matrix circuit 7 generates the third G signal by adding the second saturation correction value obtained by multiplying the difference value by the eleventh correction coefficient to the second G signal. The color difference matrix circuit 7 generates the third B signal by adding the third saturation correction value obtained by multiplying the difference value by the twelfth correction coefficient to the second B signal.

Here, when the image capturing device captures the image of the subject under the first light source, the second saturation correction value is assumed to be the negative value for attenuating the third G signal.

The color correction device further includes a saturation coefficient corrector. The saturation coefficient corrector is configured by the R saturation coefficient corrector 18, the B saturation coefficient corrector 19, and the Mg saturation coefficient corrector 20. However, the saturation coefficient corrector is not limited to a fact that the saturation coefficient corrector is configured by a plurality of saturation coefficient correctors.

When the image capturing device captures the image of the subject under the second light source, the saturation coefficient corrector performs correction such that a part of the eleventh correction coefficient is caused to be close to 0 so as to prevent the third G signal from being corrected in the negative direction by the second saturation correction value.

By including the color difference matrix circuit 7 and the saturation coefficient corrector, even when the image capturing device captures the image of the subject under the second light source, it is possible to obtain the more natural image having the gradation.

When the image capturing device captures the image of the subject under the second light source, the saturation coefficient corrector preferably performs the correction so that a part of the tenth correction coefficient is caused to be close to 0 to prevent the third B signal from being corrected in the negative direction by the first saturation correction value. When the image capturing device captures the image of the subject under the third light source, it is desirable that the saturation coefficient corrector performs the correction so that another part of the eleventh correction coefficient is caused to be close to 0.

It is desirable that the color difference matrix circuit 7 divides the color space into a plurality of regions, corrects the second R signal, the second G signal, and the second B signal for each region, and generates the third R signal, the third G signal, and the third B signal for each region. The number of divided regions of the color space is not limited to six, but as illustrated in FIG. 3, the region thereof may be divided into six by the straight line indicating G−B=0, B−R=0, and R−G=0.

When the color space is divided into a plurality of regions, the tenth to twelfth correction coefficients may be set as a combination of correction coefficients to be multiplied by the above-described difference value for each region. When the image capturing device captures the image of the subject under the second light source, the saturation coefficient corrector may perform correction so that at least a part of the correction coefficient set in a first specific region of the plurality of regions is caused to be close to 0. As an example, the regions Ar1 to Ar3 are the first specific regions.

When the image capturing device captures the image of the subject under the third light source, the saturation coefficient corrector may perform the correction so that at least a part of the correction coefficient set in a second specific region of the plurality of regions is caused to be close to 0. As an example, the regions Ar1 and Ar6 are the second specific regions. The first specific region and the second specific region may partially overlap each other.

In accordance with the above-described configuration and operation, the color correction device according to one or more embodiments can automatically correct, the color of the image capturing signal so that the color becomes the natural color in response to the type of the light source.

What is claimed is:

1. A color correction device used for an image capturing device, the color correction device comprising:
    a linear matrix circuit configured to generate a second R signal, a second G signal, and a second B signal by performing a matrix operation of a correction coefficient of 3 rows×3 columns including first to third correction coefficients, fourth to sixth correction coefficients, and seventh to ninth correction coefficients on a first R signal, a first G signal, and a first B signal that are generated by the image capturing device capturing an image of a subject; and
    an R coefficient corrector configured to perform correction so that the first correction coefficient to be multiplied by the first R signal is caused to be close to 1, and the second and third correction coefficients to be respectively multiplied by the first G signal and the first B signal are caused to be close to 0, as a first difference value obtained by subtracting the first G signal from the first B signal increases, when the first difference value exceeds a first threshold.

2. The color correction device according to claim 1, further comprising:
    a G coefficient corrector configured to perform correction so that the fifth correction coefficient to be multiplied by the first G signal caused to be close to 1, and the fourth and sixth correction coefficients to be respectively multiplied by the first R signal and the first B signal are caused to be close to 0, when a second difference value obtained by subtracting the first G signal from the first R signal exceeds a second threshold.

3. The color correction device according to claim 1, further comprising:
    a color difference matrix circuit configured to generate a third R signal, a third G signal, and a third B signal by adding, to the second R signal, a first saturation correction value obtained by multiplying a difference value of a combination of any two of the second R signal, the second G signal, and the second B signal by a tenth correction coefficient including a plurality of correction coefficients, by adding, to the second G signal, a second saturation correction value obtained by multiplying the difference value by an eleventh correction coefficient including a plurality of correction coefficients, and by adding, to the second B signal, a third saturation correction value obtained by multiplying the difference value by a twelfth correction coefficient including a plurality of correction coefficients, wherein
    the second saturation correction value is set to a negative value so as to attenuate the third G signal when the image capturing device captures the image of the subject under a first light source having a wide-band wavelength including all the color components of R, G, and B, and
    the color correction device further comprises:
    a saturation coefficient corrector configured to perform correction so that a part of the eleventh correction coefficient is caused to be close to 0 to prevent the third G signal from being corrected in a negative direction by the second saturation correction value when the image capturing device captures the image of the subject under a second light source having a narrow-band wavelength mainly including the color component of B.

4. The color correction device according to claim 3, wherein
    the saturation coefficient corrector performs correction so that a part of the tenth correction coefficient is caused to be close to 0 to prevent the third R signal from being corrected in the negative direction by the first saturation correction value when the image capturing device captures the image of the subject under the second light source.

5. The color correction device according to claim 3, wherein
    the saturation coefficient corrector performs correction so that another part of the eleventh correction coefficient is caused to be close to 0 when the image capturing device captures the image of the subject under a third light source having a narrow-band wavelength mainly including the color component of R.

6. The color correction device according to claim 5, wherein
    the color difference matrix circuit generates the third R signal, the third G signal, and the third B signal for each region by dividing color space into a plurality of regions and by correcting the second R signal, the second G signal, and the second B signal for each region,
    the tenth to twelfth correction coefficients are set as a combination of correction coefficients to be multiplied by the difference value for each region, and
    the saturation coefficient corrector performs correction so that at least a part of a correction coefficient set in a first specific region of the plurality of regions is caused to be close to 0 when the image capturing device captures the image of the subject under the second light source.

7. The color correction device according to claim 6, wherein
> the saturation coefficient corrector performs correction so that at least a part of a correction coefficient set in a second specific region is caused to be close to 0 when the image capturing device captures the image of the subject under the third light source.

8. The color correction device according to claim 6, wherein
> the color difference matrix circuit divides the color space into six regions by straight lines indicating $G-B=0$, $B-R=0$, and $R-G=0$, and generates the third R signal, the third G signal, and the third B signal by correcting the second R signal, the second G signal, and the second B signal for each of the six regions.

\* \* \* \* \*